United States Patent
Buehlmann et al.

(10) Patent No.: US 8,422,032 B2
(45) Date of Patent: Apr. 16, 2013

(54) POSITION DETERMINATION METHOD

(75) Inventors: Andreas Buehlmann, Merligen am Thunersee (CH); Werner Vitus Stempfhuber, Oberengstringen (CH); Urs Steger, Altenrhein (CH); Matthew Desmond, Rebstein (CH)

(73) Assignee: Leica Geosystems AG, Heerbrugg (CH)

(*) Notice: Subject to any disclaimer, the term of this patent is extended or adjusted under 35 U.S.C. 154(b) by 342 days.

(21) Appl. No.: 12/678,727

(22) PCT Filed: Aug. 23, 2008
(Under 37 CFR 1.47)

(86) PCT No.: PCT/EP2008/006944
§ 371 (c)(1),
(2), (4) Date: Jul. 15, 2010

(87) PCT Pub. No.: WO2009/039929
PCT Pub. Date: Apr. 2, 2009

(65) Prior Publication Data
US 2011/0109915 A1    May 12, 2011

(30) Foreign Application Priority Data
Sep. 24, 2007  (EP) .................................. 07117079

(51) Int. Cl.
*G01B 11/14* (2006.01)
*G01C 9/00* (2006.01)

(52) U.S. Cl.
USPC .......................................... 356/614; 702/150

(58) Field of Classification Search .......... 356/614–625, 356/139.01, 139.03, 139.04, 141.1; 702/150, 702/155, 159, 11; 701/208, 209, 216
See application file for complete search history.

(56) References Cited

U.S. PATENT DOCUMENTS

| | | | |
|---|---|---|---|
| 4,726,682 A * | 2/1988 | Harms et al. ................... | 356/622 |
| 4,820,041 A * | 4/1989 | Davidson et al. ............ | 356/3.12 |
| 5,612,864 A * | 3/1997 | Henderson ....................... | 700/59 |
| 5,956,661 A * | 9/1999 | Lefebvre et al. .............. | 702/150 |
| 6,381,536 B1 * | 4/2002 | Satoh et al. .................... | 701/431 |
| 6,450,267 B2 * | 9/2002 | Ohtomo et al. ................ | 172/4.5 |
| 7,199,872 B2 * | 4/2007 | Van Cranenbroeck .. | 356/139.03 |
| 7,248,374 B2 * | 7/2007 | Bridges ......................... | 356/614 |
| 7,647,199 B2 * | 1/2010 | Green et al. ................... | 702/150 |
| 2006/0012777 A1 * | 1/2006 | Talbot et al. ............. | 356/139.01 |
| 2008/0252907 A1 * | 10/2008 | Sehr .............................. | 356/623 |
| 2010/0232714 A2 * | 9/2010 | Moeller ........................ | 382/216 |

FOREIGN PATENT DOCUMENTS

| | | |
|---|---|---|
| EP | 1 079 029 A2 | 2/2001 |
| EP | 1 464 981 A2 | 10/2004 |
| EP | 1 990 607 A1 | 11/2008 |

* cited by examiner

*Primary Examiner* — Sang Nguyen
(74) *Attorney, Agent, or Firm* — Maschoff Brennan (57) ABSTRACT

Chronologically correlated position pairs are generated in a position determination method using a unit, particularly a working machine (4), that changes its own position, having a GNSS receiver (2) and an optically measurable reference point (A) disposed in a spatially stationary manner, particularly an all-around prism (3), and having a geodetic device with a distance- and angle-measuring functionality, particularly a tacheometer (1). To this end, relative positions of the reference point (A) are determined in an interior reference system by optically measuring distance and at least one angle of the geodetic device to the reference point (A) and GNSS positions of the GNSS receiver in an exterior reference system. Equal times, or relative and GNSS positions allocated to a time frame are associated with each other, particularly in pairs, thus forming position pairs. In addition, the position pairs perform a derivation from a balanced relationship between the exterior and interior reference system, particularly from balanced transformation parameters, and determine the position of the unit, of the geodetic device, and/or of the measurable new point from said balanced relationship.

22 Claims, 6 Drawing Sheets

Fig. 5a $\overrightarrow{SP}(t_8)\ (GP_{\ddot{a}}(t_7),\ GP_{\ddot{a}}(t_9)) \iff \overrightarrow{RP}_i(t_8)$

Fig. 5b

POSITION DETERMINATION METHOD

The invention relates to a position determination method using a mobile unit, equipped with a GNSS receiver, and a total station.

A precise position determination of moving units is used in many areas. For example, it is possible by means of modern and precise position determination techniques in work with mobile working machines to achieve high working accuracy, i.e. both in height and in position, depending on circumstances, and a high degree of automation. Thus, by introducing efficient working machines designed for high work performances in the area of road construction and civil engineering, building land development and opencast mining, it has been possible in recent decades to achieve considerable progress with regard to the working speed. With the use of automated methods, the mobile working machines can follow a computer-generated required contour by comparing the respective actual positions of the mobile working machines with the required positions, which result from the computer-generated theoretical model, and triggering corresponding interactions. In addition to level surfaces, any desired uneven contours can therefore likewise be produced. A substantial constituent here is the position determination technique of the individual working machines.

Mobile units are to be understood here as meaning all units which change their position, such as working machines and in particular earth-moving and levelling machines, material-spreading or material-shaping machines, such as, for example, asphalt pavers, marking machines, material transport machines or passenger transport machines.

Precise position determination methods with the aid of a total station are also used in other areas, such as, for example, surveying.

A possible, modern technique for relatively accurate determination of the position of a mobile working machine comprises satellite position determination systems, such as, for example, GPS, GLONASS or the Galileo system currently being established. Below, the term GNSS (Global Navigation Satellite System) is always used as an overall term for all satellite-assisted positioning systems. For position determination, a GNSS receiving unit is mounted on the mobile working machine, with the result that the absolute position of the working machine can be determined with an accuracy of a few metres. Since this accuracy is not sufficient for many applications, methods known for a relatively long time from GNSS technology and intended for increasing the positional accuracy are used, such as, for example, differential GNSS or RTK. In these methods, correction values which reproduce the errors specific to the place of reception and originating in particular from refraction in the ionosphere and troposphere in the satellite signals are emitted directly or indirectly, for example, by a reference station. By simultaneous reception of the satellite signals containing errors and the correction values emitted by the nearby reference station by the GNSS receiving unit mounted on the mobile working machine, position determination which in some cases has centimeter accuracy is possible.

Depending on the method used, however, various accuracy problems can arise in the GNSS position determination. In particular, owing to the multipath effects or speed problems, for example if the phase ambiguity has to be resolved rapidly, the GNSS positions determined may have inaccuracies.

A further system-related problem of the GNSS technique is that the accuracy of the measurement to be achieved is lower in the vertical direction than the accuracy of measurement in the horizontal direction. However, since as a rule, particularly in the area of road construction, the requirements with regard to the processing accuracy in the vertical direction are higher than with regard to the processing accuracy in the horizontal direction since unwanted irregularities and waviness must always be avoided, the sole use of GNSS position determination systems is often not sufficient. Moreover, visual contact with at least three, preferably at least four, satellites must always exist for position determination via GNSS, which however is not the case especially during work under bridges, in narrow rows of houses or because of other obscurations.

Consequently, in spite of the existence of modern satellite position determination systems, the use, in particular additional use, of high-precision optical methods of measurement, as are known from geodesy, still has advantages.

Rotary laser systems which produce a laser beam rotating substantially in the horizontal plane have long been used, therefore, for exact regulation of the working height of mobile working machines. A flat quasi-laser disc which defines a required plane for at least one mobile working machine is produced thereby. The rotating laser beam is received by a receiver which is mounted on the working machine, consists, for example, of a plurality of vertically distributed detectors and is optionally vertically adjustable, with the result that vertical information can be obtained with high accuracy. If the position is also desired, this is often additionally determined with the aid of GNSS systems.

However, it is in general only possible to specify vertical information for the mobile working machine on the basis of this method. However, GNSS inaccuracies in a horizontal plane are not taken into account and GNSS signal failures, for example under bridges, cannot be compensated. Likewise, it is not possible to specify working paths with desired waviness.

A further possibility for exact position determination is the sufficiently well known optical surveying, in particular with automatic target tracking, of a reflector mounted on the mobile working machine by means of a geodetic device having distance and angle measuring functionality, accuracies in the sub-centimetre range being achievable even for distances of several hundred metres.

Generally known examples of such surveying devices or geodetic devices are a theodolite or a total station. An overview of geodetic measuring apparatuses of the prior art is given in "Electronische Entfernungs- and Richtungsmessung [Electronic Distance and Direction Measurement]" by R. Joeckel and M. Stober, $4^{th}$ edition, Verlag Konrad Wittwer, Stuttgart, 1999. Such devices have angle or direction and/or distance measuring functions which permit a direction and distance determination to a chosen target. The angle or distance quantities are determined in the internal reference system of the device and generally also have to be linked to an external reference system for an absolute position determination.

In addition, a machine to be surveyed may additionally have a GNSS receiver, with the result that measurement failures of the geodetic device, for example due to obstruction of the direct visual contact with the working machine, or of the GNSS, for example under bridges or in narrow rows of houses, can be mutually compensated.

Thus, with automatic target tracking of a reflector coordinated with the working machine, a high degree of automation can be achieved in the surveying process itself but not in the linking of the internal and external reference systems. In general, complicated and professionally performed erection and initialization of the geodetic device with a precise measurement is therefore necessary beforehand.

In principle, the absolute position of the measuring device to be determined in an external reference system can be derived from measurements to known, fixed measuring points. For this purpose, the position of the surrounding measuring points was first calculated relative to the location of the geodetic device in a local, internal reference system. With the aid of the known absolute coordinates of the measuring points, if more than the required number of measurements exist, fitted transformation parameters are calculated, from which all local relative positions known in the internal reference system can then be related to the external reference system.

For example, the European patent application with the application number 07107973.5 and the title "Method of position determination for a geodetic surveying apparatus" describes a method for automated derivation of such fitted transformation parameters, coordination of measured relative positions to corresponding reference positions of reference points being effected for this purpose on the basis of the known relative position of the reference points to one another.

The derivation of a fitted relationship between two reference systems can be illustrated by an example: distances and directions are measured to some surrounding points and the position of these points relative to the location, i.e. in a local coordinate system, is plotted on a transparent film. A map of the desired coordinate system is now placed under this film. This system may be the national coordinate system or the coordinate system of a specific construction project. The measuring points can now be found on this map. The film is rotated and shifted until the film points correspond as well as possible to the points drawn on the map, which can be effected algorithmically by a fit calculation by the least squares method. The coordinates of the local relative points can now be read on the map. This principle is used in practice not graphically but analytically, it always being necessary for the point number of a measuring point and the measured values from the geodetic device to this measuring point to be known and assigned.

The calculations required for this purpose are integrated in terms of software into most modern total stations and tacheometers. However, this still means that measurable measuring points assigned a known position must exist in an external reference system and their point numbers must be input in a linked manner. The coordinates of the location of the geodetic device and other desired results are then automatically calculated from the measurements and can be stored or output. The minimum number of measurements to known measuring points in the case of three-dimensional systems which have a common scale and are required for such calculation comprises the determination of in each case distance and direction to two measuring points. In practice, however, measurements over and above this are, if possible, carried out in order to obtain, by agreement, data on the reliability of the results.

In the technical literature, such transformations of coordinates from a first, for example internal reference system to a second, for example external reference system, which are carried out for geodetic purposes, are referred to as a Helmert transformation.

Calculations with which a relationship between two reference systems is to be determined from measurements of direction and distance to more than two fixed points can be effected, for example, by means of a fit by the Gaussian least squares method, it being possible to express the relationship by transformation parameters.

The erection of a total station and the associated measurement of known measuring points, which must necessarily exist with the use of this method, are generally suited to the trained surveying engineer with regard to user guidance. The user must reliably identify in the field the measuring points used for calculating the relationship between internal and external reference system and assign to them the correct point numbers which produce the linkage to the position of the measuring point. This is possible as a rule only with a plan in which ground and measuring points are entered. A corresponding manual assignment of actual measurement to measuring point is therefore time-consuming and susceptible to error.

Moreover, specific applications, such as, for example, the use of total stations for controlling mobile construction machines, require that the devices must be operated even by surveying technicians who are not specially trained. Device configurations and user guidance to date are, however, not suited to this group of users.

Position determination methods of the prior art with the aid of optical geodetic devices are therefore based on the surveying of measuring points which have a known position and whose measured values are recorded or further processed together with the point number or the position data of the measuring points. This necessary assignment of measured values to points during the measurement slows down the method, increasing the susceptibility to errors and complicates the possibility of automation.

SUMMARY

An object of the present invention is therefore to provide an improved and simplified position determination method for a mobile working machine.

A further object of the present invention is to reduce the susceptibility to errors and the time requirement for the initialization and stationing of an optical geodetic device.

A further object of the present invention is to permit a simple automated position determination of a construction machine with the aid of a geodetic device having angle and distance measuring functionality.

These objects are achieved by realizing the method features of the independent claim. Features which further develop the invention in an alternative or advantageous manner are described in the dependent patent claims.

The positioning method according to the invention permits a linkage of a GNSS position determination to a position determination on the basis of a geodetic device and an associated use in each case of the advantages of the two methods. Thus, the invention makes it possible for a total station used for surveying a moving working machine to begin, without prior determination of the absolute position thereof, immediately with the measurement, in particular automatic measurement, of distances and angles to a reference point coordinated with the machine.

A precondition of the method is that the moving machine has a position determination apparatus, such as a GNSS receiver, with which a position determination is possible at least at some times.

According to the invention, GNSS positions are then advantageously determined in real time, for known times, as reference positions of the advancing working machine and relative positions of the reference point coordinated with the working machine are determined by means of the total station. The GNSS positions relate to the external coordinate system and the relative positions to the internal coordinate system based on the total station. At least in some cases, both a GNSS position and a relative position are determined for the same times or times close together, the positions corresponding to a time being coordinated with one another in each case in pairs and hence forming a chronologically correlated position pair in each case for one or two adjacent times.

The chronological linkage and the maximum permissible chronological interval of the GNSS and the relative position are dependent on the desired accuracy of positioning and the machine parameters, in particular the typical machine dynamics. In many cases, these quantities are also linked to one another since, for example, a slowly travelling machine which is intended to apply or form a highly precise surface firstly requires a higher accuracy but secondly also has only small positional changes per unit time. In comparison, different accuracy requirements are applicable for a roughly levelling, rapidly travelling machine, but this machine also has relatively large changes of location per unit time. In general, it is therefore true that high speed and high accuracy requirements regarding the position determination permit a chronologically smaller interval between the measurements than slow speeds and lower accuracy requirements. By means of this chronological assignment of the GNSS and relative position within a dynamic- and accuracy-related maximum permissible time window, different rates for the two measuring principles are also realizable. In particular, the measurements to the relative positions can be effected more slowly or more rapidly than the GNSS update rates. Here, in each case positions to be coordinated with the other measuring principle can also be extrapolated or interpolated between the positions of a measurement series, for example in a piece-by-piece linear approach.

A fitted relationship between external and internal reference system can now be derived from the correlations of the individual position pairs in each case, this relationship being represented in particular by fitted transformation parameters. For example, this relationship can be derived on the basis of a fit calculation according to the Gaussian least squares method, it being possible in principle to use all fit calculation methods known according to the prior art.

The fitted relationship derived now indicates how the external reference system is associated with the internal reference system based on the total station. On the basis of this relationship, for example, the coordinates of the relative positions measured by the total station or the position of the total station itself can now be transformed into the external reference system and used for position determination of the working machine in the external reference system.

A time-dependent determination of GNSS positions is known according to the prior art. For this purpose, the mobile working machine has a GNSS receiver whose position is automatically determined in an external reference system—in particular continuously and with a certain frequency which is not necessarily known. Likewise, further GNSS positions for intermediate times could additionally be determined from the directly determined GNSS positions, which can be effected, for example, by means of a derivation of trajectory.

The determination of the relative positions of the measurable reference point which has a fixed spatial relationship to the GNSS receiver of the working machine and in particular is in the form of a directed reflector, all-round reflector or 360° prism is effected by measurement of the distance and at least one solid angle and in particular two solid angles from the total station to the reference point.

As a rule, the GNSS positions and the relative positions are determined in three dimensions, it then generally being necessary to determine seven transformation parameters as a fitted relationship, including three translations, three rotations and a scale. With the same scale of the reference systems, in theory a minimum number of two position pairs coordinated with one another and comprising in each case a GNSS position and a relative position determined for the same time is necessary for calculating these parameters. On the basis of a determination of further chronologically corresponding position pairs, it is possible, as described above, to derive fitted transformation parameters using a fit calculation. In particular, such a fit calculation can be carried out automatically after each further determination of a chronologically corresponding position pair coordinated with one another or in a fixed rhythm, after which the fitted transformation parameters can be updated in each case and thus refined. In addition, a plausibility check of the position determinations carried out by means of the total station and GNSS can be effected, for example "outliers", i.e. implausible positions, being eliminated and not being taken into account for an updated derivation of the fitted relationship.

If a position determination of the working machine is required only in two dimensions or one dimension, the transformation parameters to be calculated are correspondingly reduced, which may be the case, for example, on an extensive plane, such as, for example, an airfield.

Since the GNSS position determinations serving as reference points have inaccuracies in the vertical direction and hence the fitted transformation parameters based thereon can likewise be derived only with lower determination, it is additionally possible to establish a reference to a known height. For example, this can be effected by additional measurement of a fixed point position at a known height, this then being taken into account when deriving the fitted transformation parameters. The relative positions thus transformed into the external reference system may then be a very accurate indication of the true absolute position of the working machine.

In the event of a failure of a system, for example at a position of the working machine under a bridge, where a GNSS position determination is impossible, a position determination of the working machine can still be ensured. In such a case, further relative positions can be determined on the basis of the total station, which relative positions can be converted into absolute positions using the fitted relationship.

A further possible use of the method according to the invention is for improving or replacing the GNSS positions, determined by means of GNSS and generally having lower accuracies, by the transformed relative positions usually determined more accurately. For example, it is also possible to replace only individual coordinates, in particular in the vertical direction of the GNSS positions by corresponding coordinates of the transformed relative positions. Likewise possible is a combination of the position information determined by GNSS and total station, so that a more accurate approximation of the true position of the working machine and the true distance covered can be calculated, or the inclusion of historical position data of the trajectory covered so far. Methods known to the person skilled in the art, such as, for example, a Kalman filter, can be used for this purpose.

Expressed in general terms, reference points which can be measured by the total station are generated, according to the invention, by a moving component with a position determination apparatus present thereon. The position determination apparatus need not necessarily be a GNSS receiver but must fulfil the function of delivering in succession positions in an external reference system. For example, vehicle navigation systems with INS and coupled navigation would also be possible here. The delivered absolute positions of the advancing component are then used for establishing a relationship of the position of the total station to an external system.

The method thus permits free positioning of a total station without prior measurement of reference points, it being possible to begin the surveying process, in particular automated surveying process, immediately.

Specially trained technical personnel are not absolutely essential for erecting and initializing the total station. Stationing of the total station, i.e. referencing of the measurements based on the total station with an external reference system, can now be effected automatically as soon as different positions of the moving component at least at two times have been measured by the total station, at which times positions are also determined by the position determination apparatus. In the further working process, the stationing can be dynamically improved and a deviation or error estimation can be given.

In principle, however, the method can also be used without a dynamic element for which chronologically correlated position pairs are produced from a relative position and an absolute reference position. Thus, the reference positions determined by GNSS, which are necessary for deriving the fitted relationship between reference system based on the total station and external reference system, could, for example, also represent a plurality of reference points whose positions are known in the external reference system. The identification and assignment of the reference points to corresponding relative positions, which is effected according to the above description, on the basis of identical times for which the positions are determined, is however then effected, for example, by the user. However, in the method according to the invention, the order of sequential measurement of new points to be surveyed and reference points can be neglected. On the other hand, in methods of the prior art, the known reference points are first surveyed, fitted transformation parameters are then derived and only thereafter is the surveying of the new points begun.

For example, a very wide range of new points whose absolute positions are to be determined can be immediately sequentially measured using the total station and their relative positions in the internal reference system based on the total station can be determined thereby. To ensure that these measured relative positions acquire a relationship to the external reference system, in each case measurement of one or more reference points can now be effected, without observing an order, before, between or after the sequential measurement to the measuring points. However, identification and assignment of these reference points is additionally necessary. As soon as at least two reference points have been surveyed in the course of measurement and assigned to certain relative positions, transformation parameters can be derived and, on the basis of these and retroactively, all relative positions already measured can be transformed into the external reference system. If further known reference points are surveyed and identified in the further working process, the transformation parameters can be derived again and updated, whereupon all already determined relative positions of the measuring points can also be transformed in updated form into the external reference system and their absolute position data thus improved.

Accordingly, a measurement sequence of reference points and new points to be surveyed sequentially can also be freely specified by the user. For example, the measurement sequence could be established by the direction of respective points in space, for example from left to right in the field of view. Thus, confusion or accidental double measurement of points to be surveyed can be prevented. It is also conceivable that visual contact from a known reference point to the total station will be obstructed and will become free of obstruction only in the later course of the work, for example during building demolition work. This known reference point could then be surveyed later, the fitted transformation parameters then updated and an updated absolute position calculated retroactively for all previously determined relative positions.

BRIEF DESCRIPTION OF THE DRAWINGS

The method according to the invention is described below in more detail, purely by way of example, on the basis of specific working examples shown schematically in the drawings, further advantages of the invention also being discussed. Specifically:

FIG. 2 a-c show an illustrative example of the position determination method according to the invention;

FIG. 4 a-c show a further illustrative example of the position determination method according to the invention and FIG. 5 a-b show two examples of different rates in the determination of GNSS and relative positions in the position determination method according to the invention.

DETAILED DESCRIPTION

Figure 1:
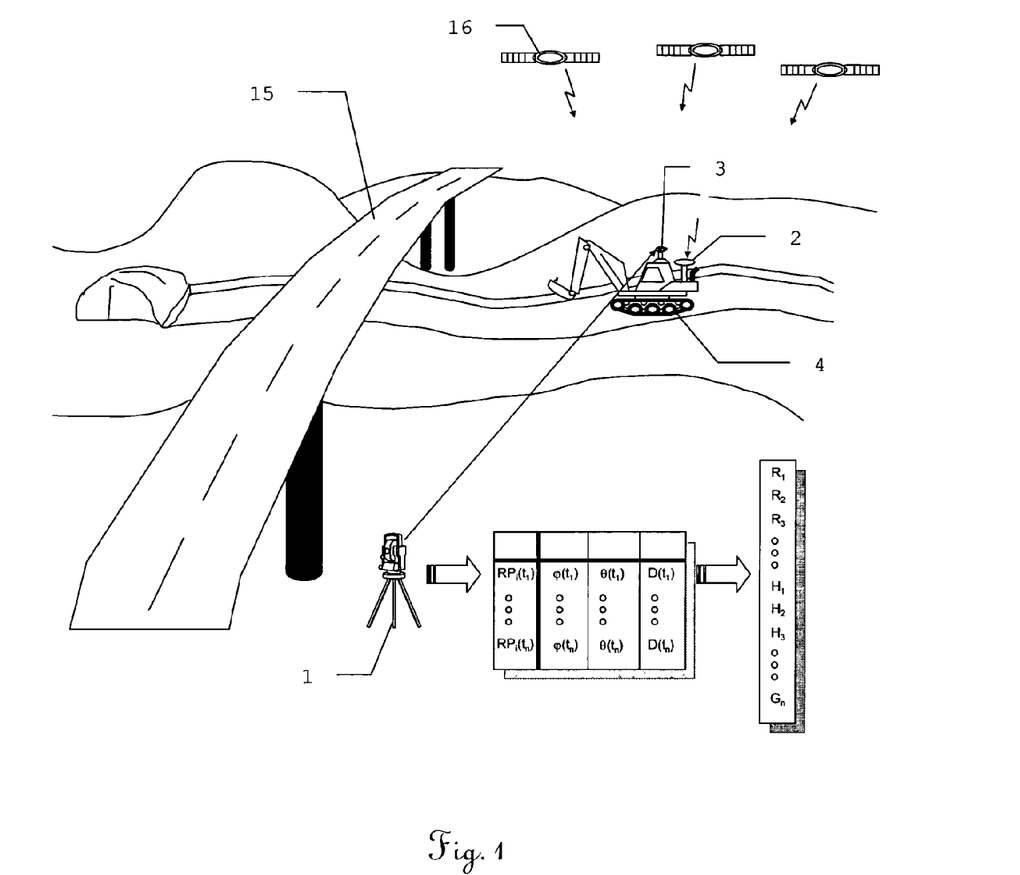
FIG. 1 shows a construction work scenario on the ground with a mobile working machine and a total station determining the position of the working machine.

FIG. 1 shows a typical scenario in road construction work, it being intended to determine the position of a mobile working machine 4 continuously, for example for controlling said machine. As is known from the prior art, the mobile working machine has for this purpose a GNSS receiver 2 and an all-round prism 3 as an optically measurable reference point, coordinated in a fixed spatial manner with the GNSS receiver 2. In order, for example, to obtain positions of the working machine even under a bridge 15, a total station 1 for automatic target tracking of the all-round prism 3 fixed to the working machine 4 is erected at any desired position on the ground.

According to the invention, chronologically correlated position pairs are now generated. For this purpose, the moving working machine 4 generates reference points whose positions are determined both absolutely by means of the GNSS receiver on the basis of GNSS signals and relatively by means of the total station 1. For this purpose, the total station measures in each case two angles $\phi$, $\theta$ and the distance D from the total station 1 to the working machine, in particular to an all-round prism 3 fixed thereon, as a reference point. The angles $\phi$, $\theta$ and the distance D define in each case relative positions $RP_i$ of the reference point for known times $t_1$, $t_2$, ... in an internal reference system based on a total station. Since absolute GNSS positions $GP_ä$ of the GNSS receiver 2 in the external reference system are also determined for the same times, absolute and relative positions determined for the same times can now be coordinated with one another in pairs in each case and thus form position pairs. In particular, this determination of the relative and GNSS positions is effected continuously during the work.

What is sought is a relationship between the internal and external reference system, for example for converting the relative positions into absolute positions. This relationship, which can be stated in particular on the basis of six transformation parameters, can now be derived from the individual links between relative and GNSS positions coordinated with one another. If more than two position pairs are generated, the relationship sought is derived by means of fitting, i.e. on the basis of a fit calculation, such as, for example, according to the Gaussian least squares method.

In particular, the method is carried out continuously so that further relative positions and GNSS positions are constantly measured. As soon as a further position pair has been generated, an updated, improved fitted relationship can be derived from the existing linkages of the position pairs and the newly added linkage. Moreover, all quantities determined in the internal reference system, such as the relative positions already determined, can be transformed again and in an improved manner into the external reference system on the basis of the updated relationship.

If there is a possibility for data exchange between the total station and the GNSS receiver, this method can be carried out both in real time and completely automatically so that the total station is automatically stationed, i.e. related to an external reference system. When the method is carried out continuously, the stationing is improved and updated dynamically in the course of the working process.

All quantities determined in the internal reference system, such as, for example, relative position components, including in particular vertical position components, relative position change vectors, speed vectors and/or the relative position of the total station, can now be transformed into the external reference system by means of the calculated fitted relationship.

Figure 2A:
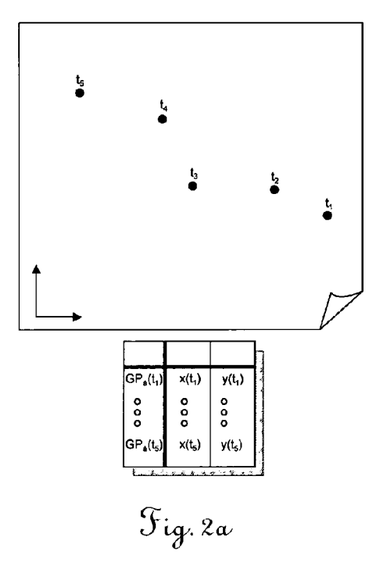
Figure 2B:
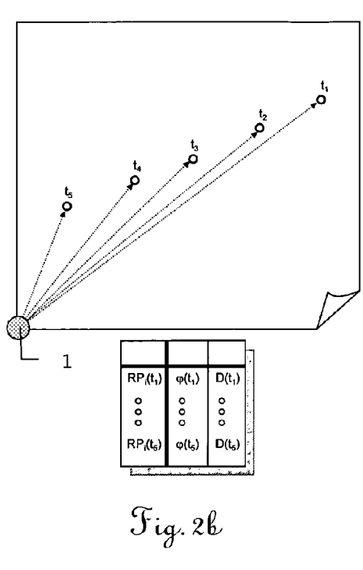
Figure 2C:
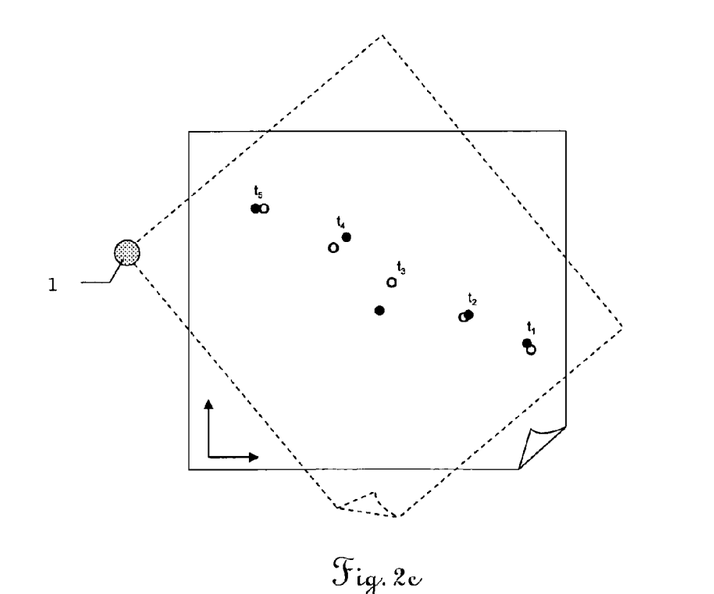

FIG. 2a-c illustrate, by way of example, in two dimensions, a determination of GNSS positions $GP_ä$ and relative positions $RP_i$ of the working machine for known, in each case identical times $t_1, t_2, \ldots$ and the derivation of a fitted relationship. FIG. 2a shows the GNSS positions $GP_ä$ in the external reference system and FIG. 2b shows the total station 1 with the relative positions $RP_i$ obtained in the internal reference system by measurement of an angle φ and distance D.

For stationing the total station 1, a fitted relationship should be derived between internal and external reference system. For this purpose, the GNSS and relative positions determined in each case for identical times are coordinated with one another and linked to one another. By way of illustration for deriving the fitted relationship, the relative positions points $RP_i$ could now be plotted on a transparent film and the latter moved on a map with the marked GNSS positions $GP_ä$ until the respective coordinated positions $RP_i(t_1)$ and $GP_ä(t_1)$, $RP_i(t_2)$ and $GP_ä(t_2)$, ... fit as well as possible to one another and agree on average, as is shown by way of example in FIG. 2c.

This principle can now be used not graphically but analytically, for example on the basis of a fit calculation via the least squares method.

The two-dimensional representation is chosen here purely for easier illustration, and this principle can equally well be used in three dimensions.

In this example too, for the sake of simplification, only one determination of GNSS and relative positions is shown in each case for the same times. Between these times, both further relative positions and further GNSS positions which are not used for deriving the fitted relationship can be determined. Additionally determined relative positions or quantities dependent thereon can clearly nevertheless be transformed on the basis of the derived fitted relationship into the external reference system and used for the absolute positioning of the working machine. In particular, the GNSS and relative positions determined for the same times and to be coordinated with one another can also be chosen as position pairs which are used for deriving the fitted relationship, according to certain criteria, for example time intervals, distance to the previous position pair, measuring angle from the total station.

Figure 3:
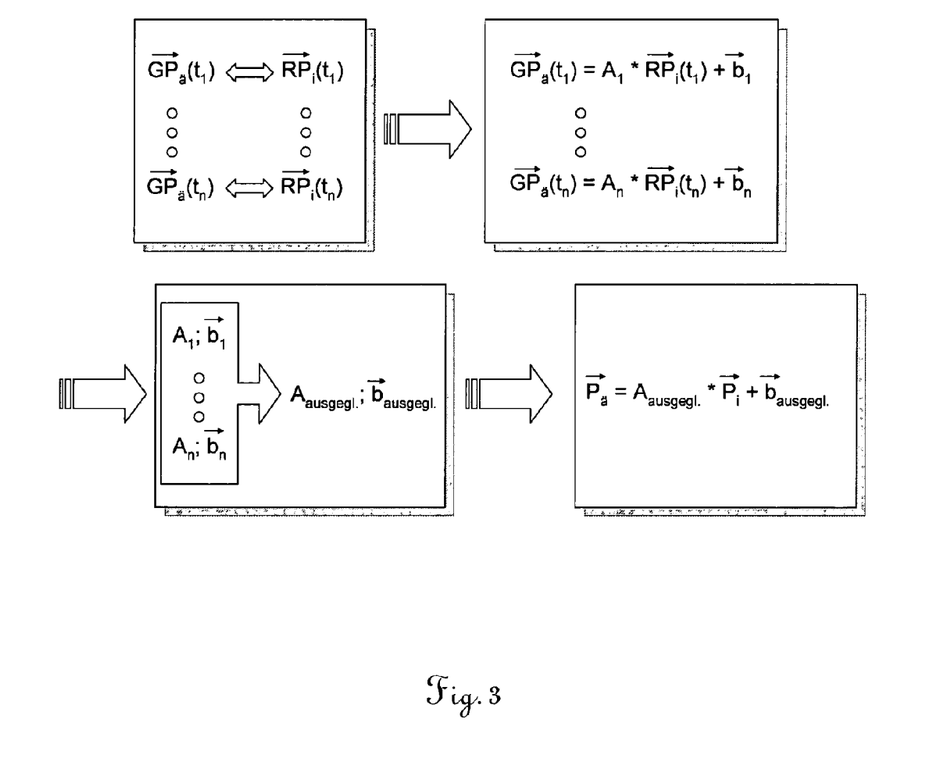
FIG. 3 shows an exemplary derivation of fitted transformation parameters in the position determination method according to the invention.

FIG. 3 shows an example of an analytical derivation of the fitted relationship from GNSS and relative positions coordinated with one another in pairs and in each case determined for the same times, as position pairs $RP_i(t_1)$ and $GP_ä(t_1)$, $RP_i(t_2)$ and $GP_ä(t_2)$, ..., $RP_i(t_n)$ and $GP_ä(t_n)$. For each position pair, in each case the transformation equations, which are shown in the second box of FIG. 3, can now be set up with the respective transformation matrices A1, A2, ... An and displacement vectors b1, b2, ..., bn. Since this system of equations—if more than two more position pairs are determined and assigned—is over determined, transformation parameters fitted therefrom are derived using the fitted matrix $A_{fitted}$ and the fitted displacement vector $b_{fitted}$. By means of these fitted transformation parameters, all quantities defined in the internal reference system, in particular the relative positions determined or the position of the total station, can now be transformed into the external reference system.

Figure 4A:
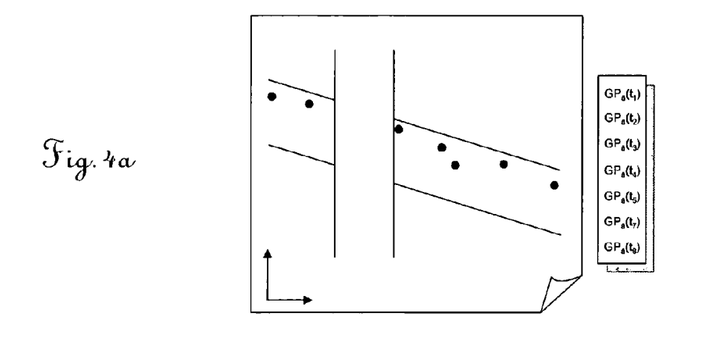
Figure 4B:
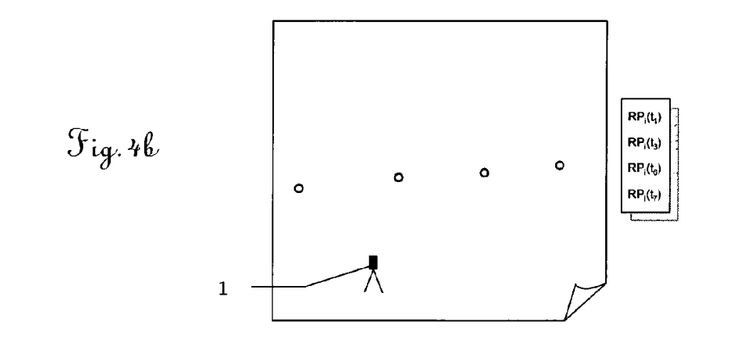
Figure 4C:
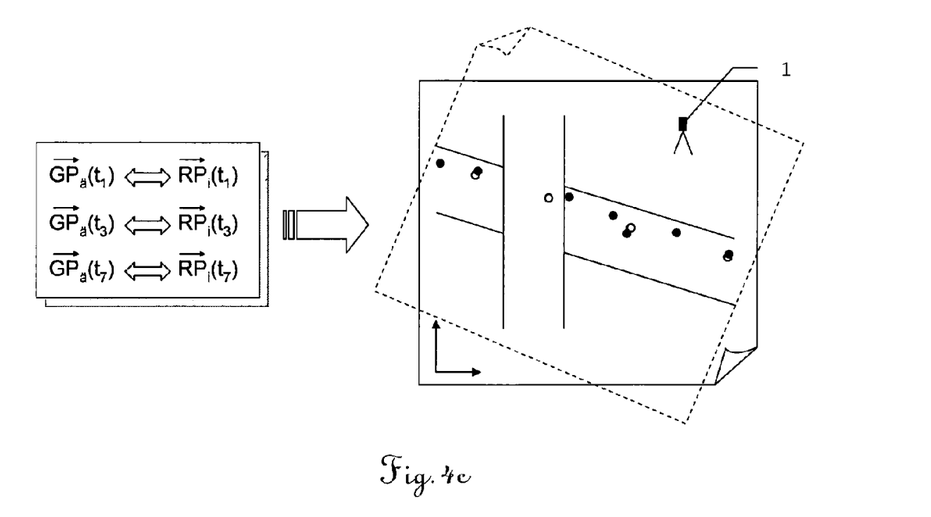

FIG. 4a-c show a further example of the use of the method according to the invention. Thus, in each case GNSS positions $GP_ä(t_1)$, ... are determined for the known times $t_1, t_2, t_3, t_4, t_5, t_7$ and $t_8$, using a GNSS receiver of a mobile working machine, in the external reference system. The GNSS positions and a road on which the mobile working machine is advancing, and a bridge passing over this road, are shown in the diagram in FIG. 4a.

Furthermore, relative positions of a reflector mounted on the working machine are determined alongside in each case for the times $t_1, t_3, t_6$ and $t_7$ by a total station 1 set up at any desired unknown position on the ground.

The GNSS relative positions determined in each case for the same times $t_1, t_3$ and $t_7$ are coordinated and linked with one another in pairs, which is shown in the left-hand box of FIG. 4c. Fitted transformation parameters are derived—as described above—from these linkages, on the basis of which transformation parameters all relative positions and the position of the total station 1 can be transformed into the external reference system. This is illustrated graphically again by rotation and displacement of a transparent film, on which the relative positions from the total station are marked, on a map representing the external reference system and comprising the GNSS positions, the rotation and displacement of the film being effected in such a way that the position pairs coincide as well as possible. As a result, the absolute positions of the working machine which are determined by GNSS can be improved by means of transformed relative positions, and absolute positions can be provided both, for example, for the time $t_6$ at which the working machine is under the bridge and for the total station 1.

As is known from the prior art, a true distance covered by the working machine can now be approximated from the absolute positions determined.

As soon as a position pair is determined for a further time, the fitted transformation parameters can be derived in updated form. On the basis of these updated transformation parameters, relative positions determined for earlier times can now be updated once again retroactively with transformation into the external reference system and can thus be improved. After each update, the approximation of the true distance covered can also be calculated again in updated form.

Figure 5A:
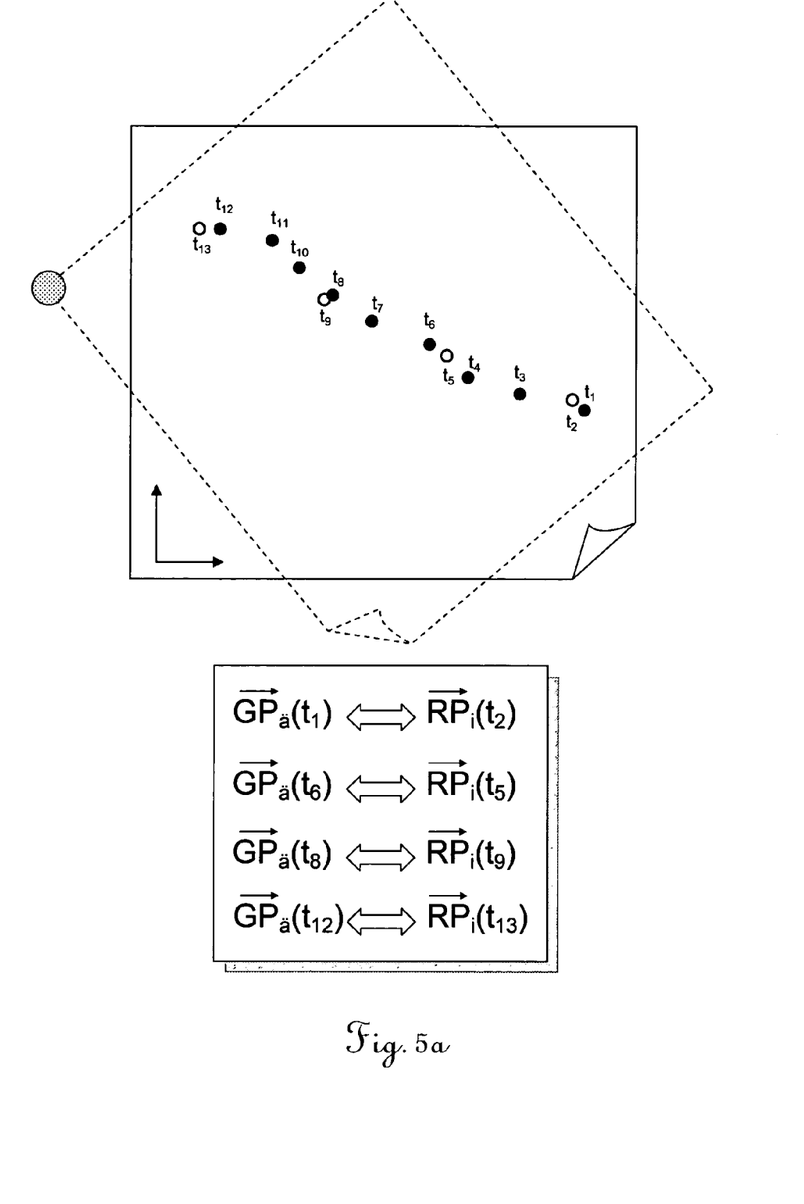
Figure 5B:
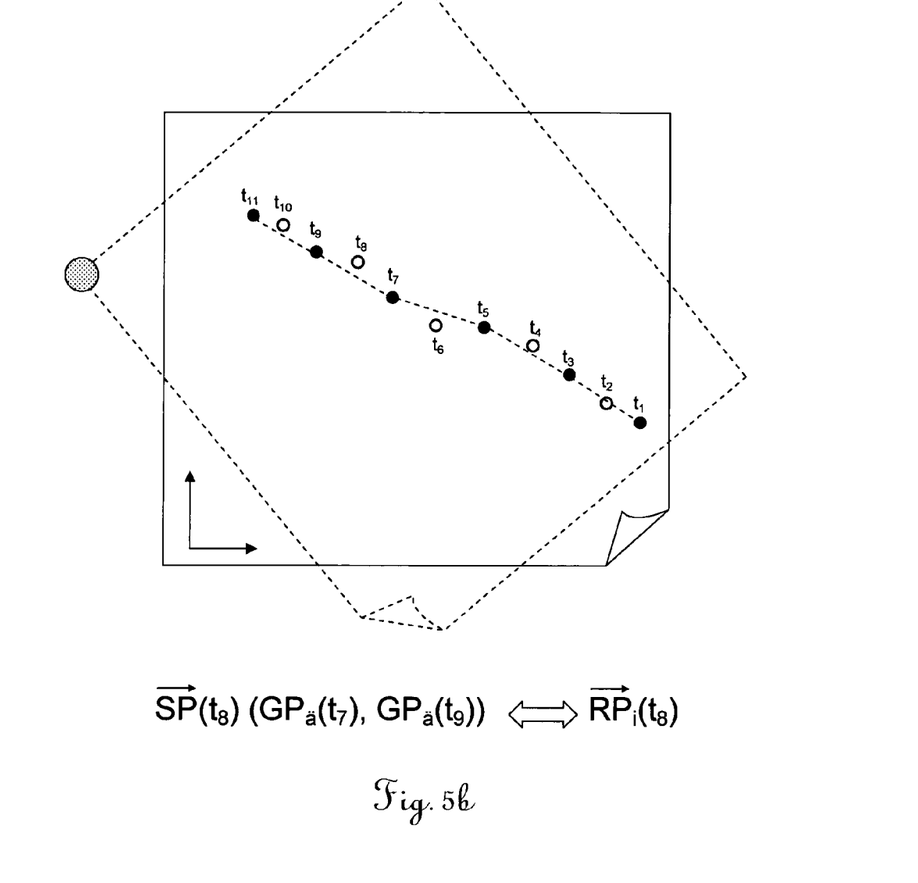

In FIG. 5a-b, the coordination of relative and GNSS positions which lie within a time window is explained with reference to two examples for different rates in the determination of GNSS and relative positions in the position determination method according to the invention. Here, relative and GNSS positions which lie within a time window are coordinated with one another, the length of the time window being chosen as a function of the dynamics of the unit and the accuracy of the position to be determined.

FIG. 5a shows a sequence of measured GNSS positions as black points and relative positions as white points. Since the two measurements take place independently of one another and at different rates, an assignment can no longer be made on the basis of an identical measuring time, i.e. strict simultaneity. In the example shown, the GNSS positions are recorded for the times $t_1$, $t_3$, $t_4$, $t_6$, $t_7$, $t_8$, $t_{10}$, $t_{11}$ and $t_{12}$, whereas the relative positions are determined at the times $t_2$, $t_5$, $t_9$ and $t_{13}$. Less stringent simultaneity is now permitted, in which positions which have occurred within a time window or with a maximum time interval relative to one another are coordinated with one another. The coordination is effected in pairs for in each case a measured relative position and in each case a measured GNSS position, i.e. exactly one relative position is coordinated with a GNSS position if such a relative position can be identified within the time window. In this specific example, the relative position of the time $t_2$ is coordinated with the GNSS position recorded at the time $t_1$, and $t_6$ with $t_5$, $t_8$ with $t_9$ and $t_{12}$ with $t_{13}$.

FIG. 5b illustrates a variant in which, on coordination, at least one of the relative or GNSS positions is generated as a synthetic position from adjacent measured relative or GNSS positions, respectively. The rates of GNSS and relative positions shown here and the corresponding coordination conditions are to be understood as being purely by way of example. In the example shown, the GNSS positions are recorded for the times $t_1$, $t_3$, $t_5$, $t_7$, $t_9$, and $t_{11}$, whereas the relative positions are determined at the times $t_2$, $t_4$, $t_6$, $t_8$ and $t_{10}$. In order to permit a coordination, synthetic positions can be determined or calculated from the positions, which is illustrated here for the example of the GNSS positions. Between the measured GNSS positions, synthetic points are derived as a function SP $(GP_ä(t_i), GP_ä(t_{i+j}))$ of the adjacent measured positions at the times $t_i$ and $t_{i+j}$, which is shown here purely by way of example for the points $t_7$ and $t_9$. Such a synthetic position can be determined, for example, as lying on the connecting line between the two adjacent positions, this line being shown in FIG. 5b as a dashed line. The exact position can be determined in various ways. For example, the line can be chronologically configured to be linear or nonlinear. In the case of a constant speed of the moving unit, the location can then be calculated as a synthetic position at the time of the relative position to be coordinated, in this case at the time $t_8$. The synthetic position thus determined can then be coordinated with the relative position of the time $t_8$.

If accelerations or braking movements occur, this can be taken into account, for example, in a position-time function. At high rates and only low speed variations, it is also possible to effect a simple position determination by means of a fixed division of the line as a synthetic position, for example a halving. This is advantageous, for example, in the case of appropriate ratios of the update rates of the position measurements, for example in the case of a ratio of 1:2. In this case, the position determinations can be synchronized so that, for every second position determination taking place at the higher rate, a chronologically correlated position determination of the other system is present. For the respective other position, a synthetic position can be derived by halving the line.

The approaches of FIGS. 5a and 5b can also be combined with one another, for example by determining, between two GNSS positions, the synthetic position closest to the relative position to be coordinated, and calculating the corresponding time at which this position determination would have had to take place. Finally, a check is carried out to determine whether this time is within the set time window around the relative position to be coordinated. Similarly, different weighting or calculation functions can be used for the coordination.

Of course, these figures shown schematically show only possible working examples. The various approaches can, according to the invention, be combined with one another and with methods of the prior art. Moreover, after the determination of the common points, i.e. coordination of reference points with datum points, is complete, methods to date for calculating the stationing point can be used.

We claim:

1. A position determination method for a unit which changes its position, the unit including a Global Navigation Satellite System receiver and an optically measurable reference point having a fixed spatial relationship relative to the Global Navigation Satellite System receiver and a geodetic device having a distance and direction measuring functionality, the method comprising:
generating chronologically correlated position pairs by measuring:
relative positions of the reference point in an internal reference system by optical measurement of in each case:
distance; and
at least one angle from the geodetic device to the measurable reference point; and
Global Navigation Satellite System positions of the Global Navigation Satellite System receiver in an external reference system;
coordinating relative and Global Navigation Satellite System positions which lie within a time window;
deriving a fitted relationship between the external and the internal reference system from the position pairs; and
determining the position of the unit of the geodetic device or of a measurable new point from the fitted relationship by a calculation unit of the unit which changes its opposition or of the geodetic device.

2. A position determination method according to claim 1, wherein the coordination in pairs is performed for, in each case, a measured relative position and, in each case, a measured Global Navigation Satellite System position.

3. A position determination method according to claim 1, wherein, on coordination, at least one of the relative or Global Navigation Satellite System positions is generated as a synthetic position from adjacent measured relative and Global Navigation Satellite System positions, respectively.

4. A position determination method according to claim 1, wherein the steps are carried out continuously taking into account the new position pair.

5. A position determination method according to claim 4, wherein the steps are carried out continuously, the fitted relationship being derived in updated form after each further generation of a position pair, taking into account the new position pair.

6. A position determination method according to claim 4, wherein the generation is carried out in a defined rhythm.

7. A position determination method according to claim 4, wherein the generation is effected in a defined rhythm with chronologically identical intervals.

8. A position determination method according to claim 1, wherein the steps take place substantially in real time and automatically.

9. A position determination method according to claim 1, wherein, on determination of the position, at least:

a transformation of quantities of the internal reference system which are linked to the relative positions, on the basis of the derived relationship, into the external reference system; and a correction of the Global Navigation Satellite System positions on the basis of the quantities transformed into the external reference system are affected.

10. A position determination method according to claim 9, wherein the relative positions themselves are transformed as quantities.

11. A position determination method according to claim 10, wherein:
relative position components;
vertical position components,
relative position change vectors; and/or
speed vectors derived from the relative positions are transformed as quantities.

12. A position determination method according to claim 10, wherein a relative device position of the geodetic device is transformed as a quantity.

13. A position determination method according to claim 10, wherein a relative new point position of a measurable new point is transformed as a quantity.

14. A position determination method according to claim 10, wherein the transformation is effected again after an updated derivation.

15. A position determination method according to claim 10, wherein the transformation is effected again after each updated derivation of the fitted relationship.

16. A position determination method according to claim 1, wherein the fitted relationship is calculated on the basis of a fit calculation of the individual relationships between the Global Navigation Satellite System and relative positions coordinated with one another.

17. A position determination method according to claim 1, wherein the fitted relationship is calculated on the basis of a fit calculation of the individual relationships between the Global Navigation Satellite System and relative positions coordinated with one another by the least squares method.

18. A position determination method according to claim 1, wherein the length of the time window is chosen as a function of the dynamics of the unit and the accuracy of the position to be determined.

19. A position determination method according to claim 1, wherein the unit is a working unit and the optically measurable reference point includes an all-round prism.

20. A position determination method according to claim 1, wherein the geodetic device includes a total station including angle measuring functionality.

21. A position determination method according to claim 1, wherein the relative and Global Navigation Satellite System positions which lie within a time window are determined at the same time.

22. A position determination method according to claim 1, wherein the fitted relationship between the external and the internal reference system derived include fitted transformation parameters from the position pairs.

* * * * *

UNITED STATES PATENT AND TRADEMARK OFFICE
CERTIFICATE OF CORRECTION

PATENT NO.       : 8,422,032 B2                                                           Page 1 of 1
APPLICATION NO.  : 12/678727
DATED            : April 16, 2013
INVENTOR(S)      : Buehlmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 456 days.

Signed and Sealed this
Eighth Day of September, 2015

Michelle K. Lee
*Director of the United States Patent and Trademark Office*